Patented Mar. 23, 1926.

1,577,916

UNITED STATES PATENT OFFICE.

SEBASTIAN LOMANITZ, OF HOUSTON, TEXAS.

INSECTICIDES STICKER MIXTURE.

No Drawing.   Application filed December 27, 1924.   Serial No. 758,396.

*To all whom it may concern:*

Be it known that I, SEBASTIAN LOMANITZ, a citizen of the United States, and a resident of Houston, county of Harris, State of Texas (whose post-office address is 1302 Congress Avenue, Houston, Texas), have invented a new and Improved Insecticides Sticker Mixture, of which the following is a full, clear, and exact description.

My invention relates to insecticides sticker mixtures in dry or powder form, and it has reference more particularly to a sticker mixture which can be added to a germicide or insecticide or both subsequently in proportions desired before applying it to plants.

The object of the invention is to provide a sticker mixture which contains a material of hygroscopic, sticky or pasty qualities that can be handled conveniently in powder form.

Another object of the invention is to provide a sticker mixture in dry form, which when added to a germicide or insecticide, or both, will obviate the necessity of using inert material as a vehicle for the sticker material.

In the manufacture of insecticides in powder form, it is desirable to incorporate an ingredient called a sticker which helps spreading out and the adhering of the mass which is the mixture of the different ingredients forming the insecticide when the same is applied to plants.

It is often necessary to provide a vehicle for the sticker before the same can be incorporated into the insecticide or fungicide. This vehicle is generally an inert substance, such as kieselguhr, the purpose of which is to enable to incorporate the sticker material uniformly into the insecticide mixture and thereby increases the spreading qualities of the sticker used. The introduction of the inert vehicle necessarily decreases the efficiency of the insecticide or fungicide mixed therewith, for it decreases the concentration of the active ingredients used in the mixture.

In my sticker mixture, the vehicle, if it may be so called, is sulphur which is a fungicide and used extensively in insecticides mixtures.

I have discovered that if a sticker material commonly used in insecticides mixtures is thoroughly mixed with sulphur to produce a homogeneous mass, the said mass can be used as a sticker material mixture to be added to insecticides and fungicides for the purposes previously mentioned.

The mixture of the sticker material which is a soap and sulphur is preferably made by mixing the two at the lowest temperature at which sulphur would fuse, which is about 115° C., and the soap is preferably still liquid. The amount of sulphur used should be enough to render the fused mass hard and brittle at normal temperature and pressure. The experiments have shown that one part of sticker material requires about 1½ parts of sulphur.

At the fusion temperature of sulphur, the sticker soap and the sulphur can be easily mixed thoroughly to obtain a homogeneous mass before the same hardens and subsequently could be easily ground to a powder of any desired mesh. The resulting powder retains all the hydroscopic, sticky and pasty qualities of the original sticky material used, but the sticky soap mixed with sulphur can be handled better and incorporated conveniently with a fungicide or insecticide. When it is brought into contact with the moisture of the plant or in the spraying tank, it acts as if the sticky material incorporated is free.

As a matter of fact, the sticky mixture seems to have additional qualities in helping of wetting the sulphur forming part of the insecticide or fungicide. The advantage of the mixture of sulphur and sticker soap to produce the sticker mixture is self-evident, for sometimes sulphur is the main ingredient in such insecticides and fungicides products. As an example, the following insecticide is given:

Sulphur, 65 to 70%; lead arsenate, 15 to 10%; sticker mixture, 10 to 5%; lime, 15%.

Of course, the sticker mixture referred to is the one intimately mixed with sulphur.

The use of sulphur as a vehicle for the introduction of the sticky material for causing, spreading and adhesion does away with the use of an inert, extraneous substance utilized for similar purposes. As a consequence of this, the cost of production and handling of the insecticide or fungicide is reduced. Therefore, fungicides and insecticides mixed with my sticker mixture are more economical, more concentrated and permit the use of a cheaper grade of sticker soaps due to the fact that the same is fused with sulphur before it is added to and used with insecticides and fungicides.

I claim:

1. A sticker mixture for insecticides and fungicides formed by a homogeneous fused mass of soap and sulphur.

2. A sticker mixture for insecticides and fungicides comprising an intimate fused mixture of sticker soap and sulphur which is brittle at ordinary temperature and pressure.

3. A sticker mixture for insecticides and fungicides, comprising a fused mass of sulphur and sticker soap in proportion of one and one-half to one respectively and which fused mass is brittle at atmospheric conditions.

4. A sticker mixture for insecticides and fungicides, comprising an intimate mixture of sulphur and sticker soap fused at a temperature not exceeding 115° C. and containing one and one-half to one of sulphur to sticker soap respectively, the fused mass being brittle at atmospheric conditions.

SEBASTIAN LOMANITZ.